(12) United States Patent
Isoda

(10) Patent No.: US 8,922,841 B2
(45) Date of Patent: Dec. 30, 2014

(54) IMAGE PROCESSING APPARATUS AND METHOD FOR CONTROLLING THE SAME

(75) Inventor: Takashi Isoda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 167 days.

(21) Appl. No.: 13/490,528

(22) Filed: Jun. 7, 2012

(65) Prior Publication Data

US 2012/0314262 A1 Dec. 13, 2012

(30) Foreign Application Priority Data

Jun. 7, 2011 (JP) .................................. 2011-127657

(51) Int. Cl.
*H04N 1/00* (2006.01)
*H04N 1/32* (2006.01)

(52) U.S. Cl.
CPC .... *H04N 1/00212* (2013.01); *H04N 2201/3273* (2013.01); *H04N 2201/3247* (2013.01); *H04N 1/32128* (2013.01); *H04N 2201/0081* (2013.01); *H04N 2201/3229* (2013.01); *H04N 1/00225* (2013.01)
USPC ..................... 358/402; 358/1.15; 379/100.08; 709/206

(58) Field of Classification Search
None
See application file for complete search history.

(56) References Cited

U.S. PATENT DOCUMENTS

| | | | | |
|---|---|---|---|---|
| 5,903,723 | A * | 5/1999 | Beck et al. ..................... | 709/201 |
| 6,275,848 | B1 * | 8/2001 | Arnold .......................... | 709/206 |
| 6,505,236 | B1 * | 1/2003 | Pollack ......................... | 709/206 |
| 7,002,700 | B1 * | 2/2006 | Motamed ....................... | 358/1.1 |
| 7,443,548 | B2 * | 10/2008 | Sprague et al. ............... | 358/474 |
| 8,639,933 | B2 * | 1/2014 | Masui ........................... | 358/1.15 |
| 2001/0054073 | A1 * | 12/2001 | Ruppert et al. ............... | 709/206 |
| 2002/0077846 | A1 * | 6/2002 | Bierbrauer et al. ............ | 705/1 |
| 2003/0182331 | A1 * | 9/2003 | Demsky et al. ............... | 707/205 |
| 2004/0068545 | A1 * | 4/2004 | Daniell et al. ................ | 709/206 |
| 2004/0117456 | A1 * | 6/2004 | Brooks ......................... | 709/217 |
| 2004/0172450 | A1 * | 9/2004 | Edelstein et al. ............. | 709/205 |
| 2004/0255247 | A1 * | 12/2004 | Demsky et al. ............... | 715/530 |
| 2005/0052692 | A1 * | 3/2005 | Buschi et al. ................. | 358/1.15 |
| 2005/0238147 | A1 * | 10/2005 | Carro .......................... | 379/88.13 |
| 2005/0289149 | A1 * | 12/2005 | Carro ........................... | 707/10 |
| 2006/0074849 | A1 * | 4/2006 | Lee .............................. | 707/1 |
| 2006/0101115 | A1 * | 5/2006 | Gleckman ..................... | 709/203 |
| 2008/0256209 | A1 * | 10/2008 | Carro ........................... | 709/206 |
| 2008/0294737 | A1 * | 11/2008 | Kim ............................. | 709/206 |
| 2010/0085596 | A1 * | 4/2010 | Park ............................ | 358/1.15 |
| 2011/0173284 | A1 * | 7/2011 | Carro ........................... | 709/206 |
| 2011/0317181 | A1 * | 12/2011 | Kanemoto .................... | 358/1.9 |
| 2012/0054461 | A1 * | 3/2012 | Asai ............................. | 711/170 |
| 2012/0151379 | A1 * | 6/2012 | Schultz et al. ................ | 715/752 |
| 2013/0159438 | A1 * | 6/2013 | Malik, Sr. .................... | 709/206 |
| 2013/0308162 | A1 * | 11/2013 | Hong ........................... | 358/1.15 |

FOREIGN PATENT DOCUMENTS

JP 2008306294 A 12/2008

* cited by examiner

Primary Examiner — Kimberly A Williams
(74) Attorney, Agent, or Firm — Rossi, Kimms & McDowell LLP

(57) ABSTRACT

An image processing apparatus capable of optically reading a document to generate an electronic file, and a method for controlling the same, in which an existing file that is to be attached to the electronic file or to which the electronic file is to be attached is specified, the name of an attachment-including file including the specified electronic file and existing file is specified, and the attachment-including file is sent under the specified name to a specified destination by a sending method for the attachment-including file.

18 Claims, 15 Drawing Sheets

| FILE FORMAT | CAPABLE OF BEARING ATTACHMENT? | EDITABLE? |
|---|---|---|
| PDF | YES | YES |
| JPEG | NO | YES |
| pptx | YES | YES |
| EXIF | NO | NO |
| xlsx | NO | YES |
| bmp | NO | NO |
| | | |
| DOCX | YES | YES |
| TIFF | NO | NO |

F I G. 6
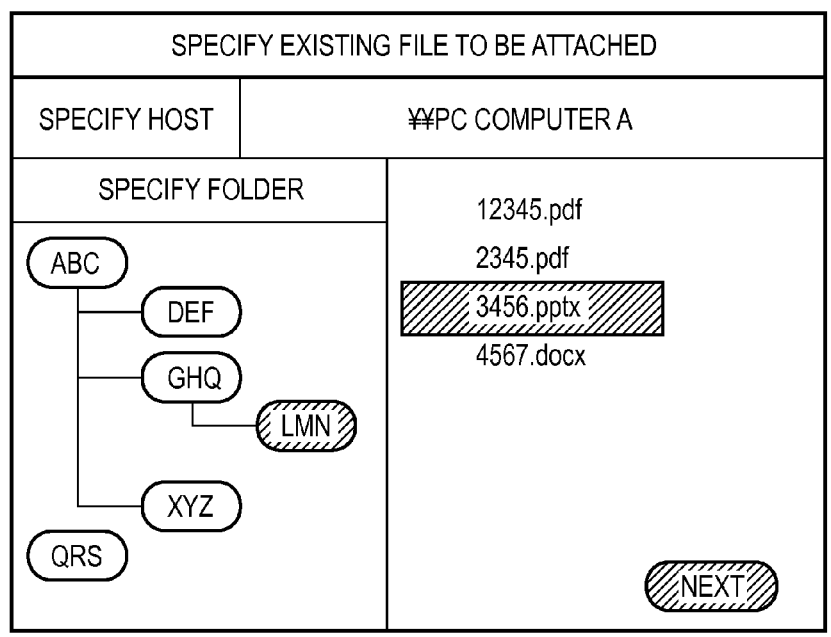

IMAGE PROCESSING APPARATUS AND METHOD FOR CONTROLLING THE SAME

BACKGROUND OF THE INVENTION

1. Field of the Invention

The present invention relates to a technology for optically reading a document to convert the document to electronic data and presenting the electronic data as a file.

2. Description of the Related Art

Some electronic file formats allow electronic files in these formats to hold other files in various types of formats therein in the form of attachment of such files to the electronic files. Also, some electronic file formats allow other files to be retrieved from inside the electronic files in these formats in the same state as that at the time of attachment. Examples of such electronic file formats include ISO-defined portable document files (PDF), Microsoft OFFICE application files (docx, ppptx), etc. The above attaching operation is executable on an application supporting the relevant file in a personal computer (PC). When a given file is attached to another file, the plurality of files can be put together and handled as one file in the file handling. Also, a function effective only for the file to which the given file is attached can be made effective for the attached file. For example, the encrypting function of PDF can be made effective for the attached file.

Recently, generation of files is increasingly being performed with frequency, not only on applications in PCs, but also in image processing apparatuses such as a multifunction machine where a document is optically read to generate an electronic file. For a file generated in such an image processing apparatus, also, there occurs a use case that requires clarification of the relevance of the file to another file in some way or another. In this situation, Japanese Patent Laid-Open No. 2008-306294, for example, describes a method where a file generated in an image processing apparatus is attached to an e-mail using the file attachment function of the e-mail and the relevance of the file attached to the e-mail to another file is described in the text of the e-mail.

The image processing apparatus described above is not provided with the function of attaching an electronic file generated by the image processing apparatus by optically reading a document to an existing file, or the function of attaching an existing file to an electronic file generated by the image processing apparatus by optically reading a document. It is however conceivable to attach an electronic file generated by the image processing apparatus by optically reading a document to an existing file, or to attach an existing file to an electronic file generated by the image processing apparatus by optically reading a document. In such a case, a PC and a supporting application operable in the PC will be necessary, in addition to the image processing apparatus. Moreover, complicated operations as follows will be necessary.

(1) The image processing apparatus reads a document to generate an electronic file.

(2) The image processing apparatus specifies an appropriate PC as the destination.

(3) The image processing apparatus sends the generated electronic file to the PC.

(4) The PC receives the electronic file.

(5) The PC opens the received electronic file on an appropriate application and attaches an existing file to be attached to the electronic file, or opens an existing file on an appropriate application and attaches the received electronic file to the existing file.

(6) The PC sends the electronic file prepared in (5) to the originally-intended destination.

Moreover, the image processing apparatus may have a list of sending destinations including sending methods and destinations previously registered and retained, and the list of sending destinations and the image processing apparatus may have an electronic signature function with the image processing apparatus itself serving as an issuer. In such a case, the user is prevented from enjoying this merit.

SUMMARY OF THE INVENTION

An aspect of the present invention is to eliminate the above-mentioned problems with the conventional technology.

The present invention provides a technique of attaching an electronic file generated by an image processing apparatus to a specified file or attaching a specified file to an electronic file generated by an image processing apparatus, and sending the resultant file.

The present invention in its first aspect provides an image processing apparatus capable of optically reading a document to generate an electronic file, comprising: a file specifying unit configured to specify a file that is to be attached to the electronic file or to which the electronic file is to be attached; a name specifying unit configured to specify a name of an attachment-including file including the electronic file and the file specified by the file specifying unit; a sending specifying unit configured to specify a sending method and a destination for the attachment-including file; and a control unit configured to send the attachment-including file under the name specified by the name specifying unit in accordance with the sending method and the destination specified by the sending specifying unit.

The present invention in its second aspect provides an image processing apparatus capable of optically reading a document to generate an electronic file, comprising: a file specifying unit configured to specify a file that is to be attached to the electronic file or to which the electronic file is to be attached; a name specifying unit configured to specify a name of an attachment-including file including the electronic file and the file specified by the file specifying unit; a storage location specifying unit configured to specify a storage location for the attachment-including file; and a control unit configured to store the attachment-including file under the name specified by the name specifying unit in the storage location specified by the storage location specifying unit.

The present invention in its third aspect provides a control method for controlling an image processing apparatus capable of optically reading a document to generate an electronic file, the method comprising: a file specifying step of specifying a file that is to be attached to the electronic file or to which the electronic file is to be attached; a name specifying step of specifying a name of an attachment-including file including the electronic file and the file specified in the file specifying step; a sending specifying step of specifying a sending method and a destination for the attachment-including file; and a control step of sending the attachment-including file under the name specified in the name specifying step in accordance with the sending method and the destination specified in the sending specifying step.

The present invention in its fourth aspect provides a control method for controlling an image processing apparatus capable of optically reading a document to generate an electronic file, the method comprising: a file specifying step of specifying a file that is to be attached to the electronic file or to which the electronic file is to be attached; a name specifying step of specifying a name of an attachment-including file including the electronic file and the file specified in the file specifying step; a storage location specifying step of specifying a storage location for the attachment-including file; and a control step of storing the attachment-including file under the name specified in the name specifying step in the storage location specified in the storage location specifying step.

According to the present invention, an electronic file generated by the image processing apparatus can be attached to a specified file, or a specified file can be attached to an electronic file generated by the image processing apparatus, and the resultant file can be sent or stored.

Moreover, since the function of the image processing apparatus of setting the sending method, the destination, the name, etc. for the attachment-including file can be used, the effect of improving the convenience of the user can be obtained.

Further features of the present invention will become apparent from the following description of exemplary embodiments with reference to the attached drawings.

BRIEF DESCRIPTION OF THE DRAWINGS

FIG. 6 is a view showing an example of the screen for specifying an existing file to be attached.

DESCRIPTION OF THE EMBODIMENTS

Figure 1:
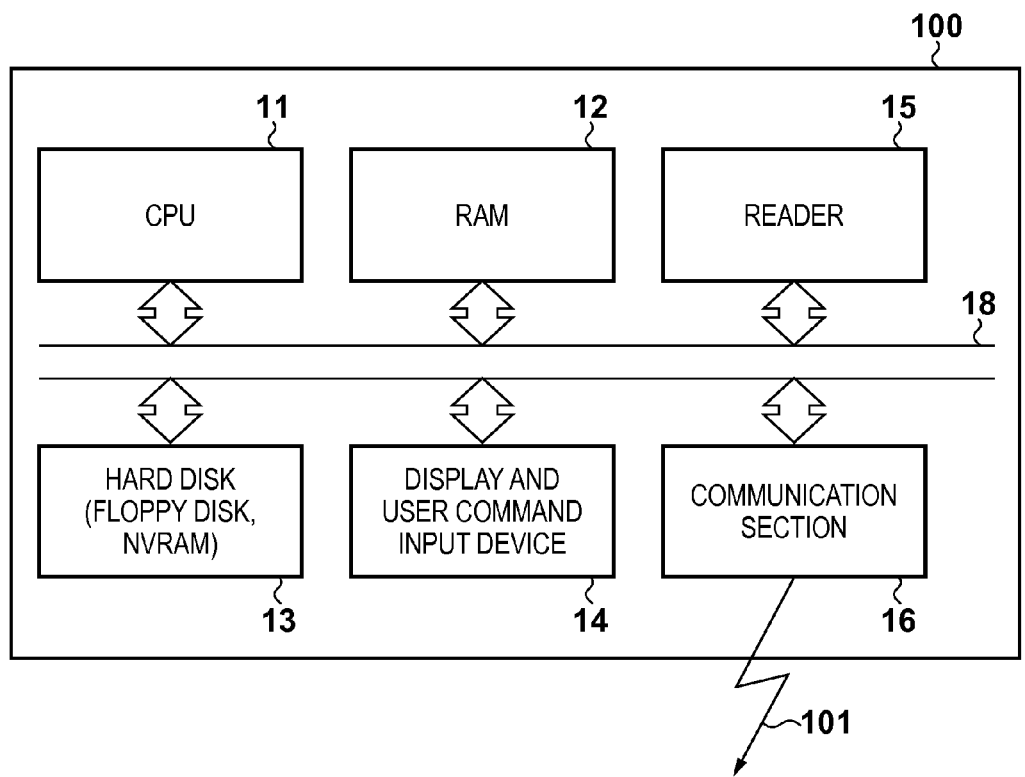
FIG. 1 is a block diagram of a configuration of an image processing apparatus of an embodiment of the present invention.

FIG. 1 is a block diagram of a configuration of an image processing apparatus 100 of an embodiment of the present invention.

The image processing apparatus 100 is connected to another apparatus via a communication line 101 and a network. A CPU 11 controls the operation of the image processing apparatus 100 in accordance with a program installed in a HDD 13 and expanded in a RAM 12. The RAM 12 provides a work area for the CPU 11 and also temporarily stores various types of data. The HDD 13 is a hard disk drive (which may be a NVRAM, etc.) for storing programs, various settings, files, etc. A display and input device (hereinafter referred to as an operating unit) 14 is used for the user to make various settings via a graphic-user interface (GUI). A reader 15 optically reads a document such as a manuscript to generate electronic data. A communication unit 16 controls communications with an external apparatus via the communication line 101. A main bus 18 connects the above components to one another to transfer data and control signals.

Note that, in the image processing apparatus 100 of this embodiment, unless otherwise specified, the CPU 11 controls the RAM 12, the hard disk 13, the operating unit 14, the reader 15, and the communication unit 16 via the main bus 18 to execute various controls.

[Embodiment 1]

Figure 2A:
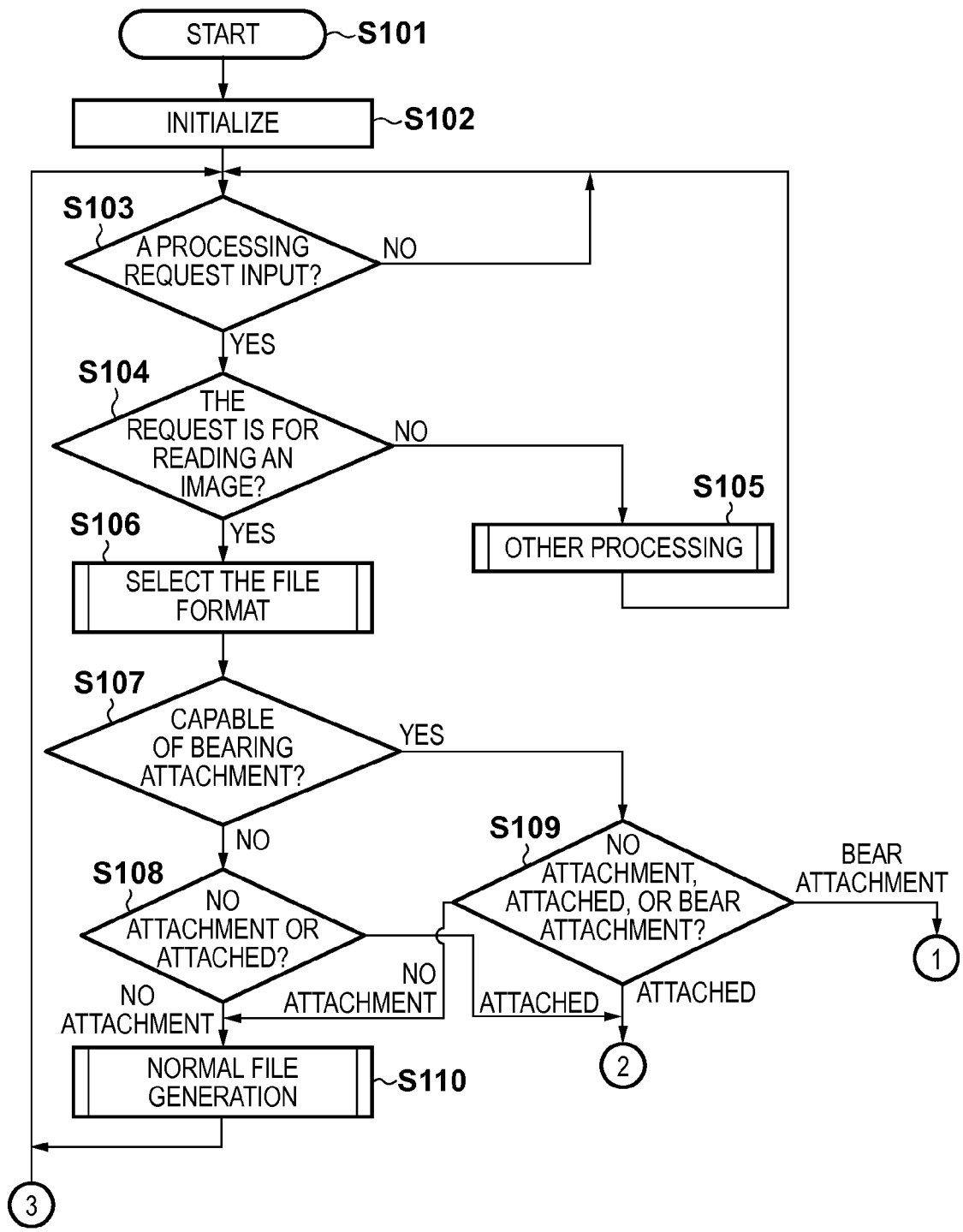
FIGS. 2A and 2B are flowcharts of the operation of an image processing apparatus of Embodiment 1.
Figure 2B:
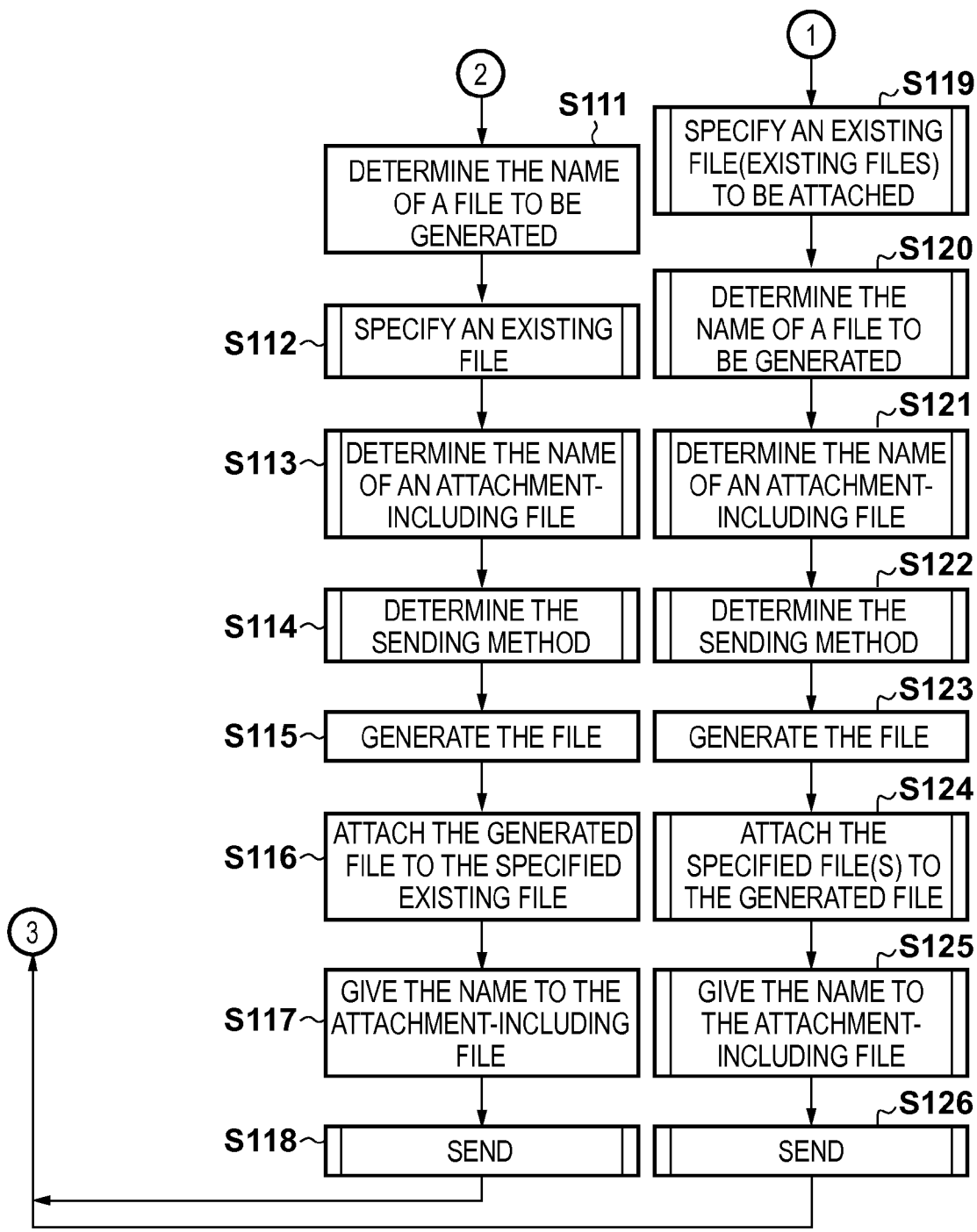

FIGS. 2A and 2B are flowcharts of the operation of an image processing apparatus of Embodiment 1. Note that the program for executing the illustrated processing is installed in the HDD 13, expanded in the RAM 12 at the time of execution, and executed under the control of the CPU 11.

This processing is started upon power-on of the image processing apparatus 100. First, in S102, the image processing apparatus 100 is initialized. The process then proceeds to S103, to wait for input of a processing request via the operating unit 14. If a processing request is input, the process proceeds to S104, to determine whether the processing request is a request for reading an image. If it is not a request for reading an image, the process proceeds to S105, to execute the type of processing corresponding to the request, and then returns to S103.

If it is determined in S104 that the processing request is a request for reading an image, the process proceeds to S106. In S106, a screen for selection of the format of a file to be generated by reading an image is displayed on the operating unit 14, to wait for an input by the user.

Figures 3, 4:
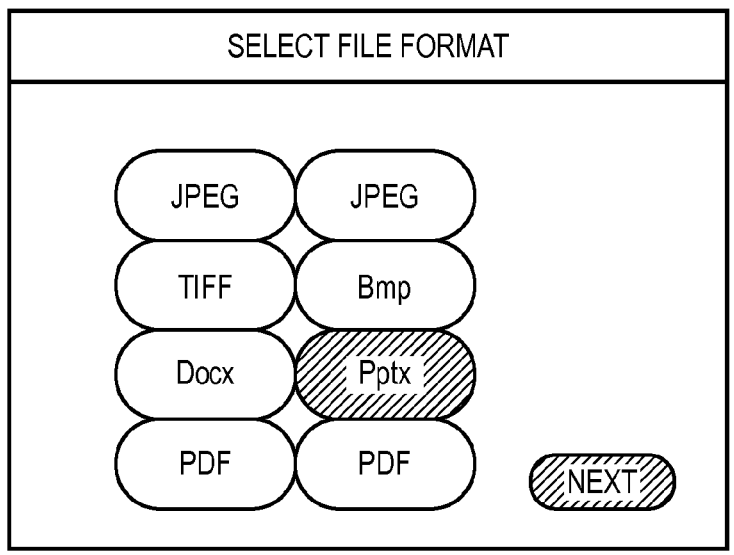
FIG. 3 is a view showing an example of the screen displayed in S106 in FIGS. 2A and 2B.
FIG. 4 is a view showing an example of the table storing whether files in listed file formats can bear another file attached thereto (capable of bearing attachment) and whether they are editable.

FIG. 3 is a view showing an example of the screen displayed in S106.

In FIG. 3, formats of files that can be prepared are listed, and the user is prompted to select one from the listed file formats. In FIG. 3, PowerPoint file format (file type) is selected.

Thereafter, the process proceeds to S107, where whether attachment of another file to the file format selected in S106 is possible (the file format is capable of bearing attachment) is determined. This determination is performed by referring to a table as shown in FIG. 4 indicating whether each of previously decided file formats can bear an attachment or not.

FIG. 4 is a view showing an example of the table storing whether files in the listed file formats can bear another file attached thereto (capable of bearing attachment) and whether they are editable. For example, in FIG. 4, a PDF file is editable, and also another file can be attached to the PDF file (the PDF file is capable of bearing attachment). A JPEG file is editable, but another file cannot be attached to the JPEG file (the JPEG file is not capable of bearing attachment).

Figure 5A:
FIGS. 5A and 5B are views showing examples of the screen prompting the user to input whether to attach a file to be generated or an existing file.

If it is determined in S107 that a file format that is not capable of bearing attachment has been selected, the process proceeds to S108. In S108, a screen as shown in FIG. 5A is displayed on the operating unit 14, to prompt the user to select "attach a file to be generated to an existing file" or "no attachment" indicating that normal image generation is to be performed, and wait for an input by the user.

Figure 5B:

FIG. 5B is a view showing an example of the screen prompting the user to select "attach a file to be generated to an existing file," "attach an existing file to a file to be generated," or "no attachment."

If it is determined in S107 that a file format that is capable of bearing attachment has been selected, the process proceeds to S109. In S109, a screen as shown in FIG. 5B is displayed on the operating unit 14, to prompt the user to select "attach a file to be generated to an existing file," "attach an existing file to a file to be generated," or "no attachment" indicating that normal image generation is to be performed, and wait for an input by the user.

If the input is "no attachment" in S108 or S109, the process proceeds to S110, to perform normal file generation of reading a document with the reader 15 to generate an electronic file. Then, the process returns to S103.

If the input is "attach a file to be generated to an existing file" in S108 or S109, the process proceeds to S111, to determine the filename of the file to be generated by reading the document with the reader 15. To determine the filename, various ways have been presented although the details thereof are omitted here because they are not directly related to the present invention. The process then proceeds to S112, where a screen as shown in FIG. 6 is displayed on the operating unit 14 for determination of the existing file to which the file to be generated is to be attached, to wait for an input by the user.

FIG. 6 is a view showing an example of the screen for specifying the existing file to which the file to be generated is to be attached.

Using the screen of FIG. 6, the user can specify the name of an electronic apparatus and a folder in which the existing file to which the file to be generated is to be attached is present. Only files that can be edited by the image processing apparatus 100, indicated in the relationship between the file formats and whether to be editable in FIG. 4, are displayed among the files in the thus-specified folder. The user can select one file from the displayed files.

In FIG. 6, file "3456.pptx" in folder "\ABC\GHQ\LMN" in computer A is specified as the file to which the file to be generated is to be attached.

Figure 7:
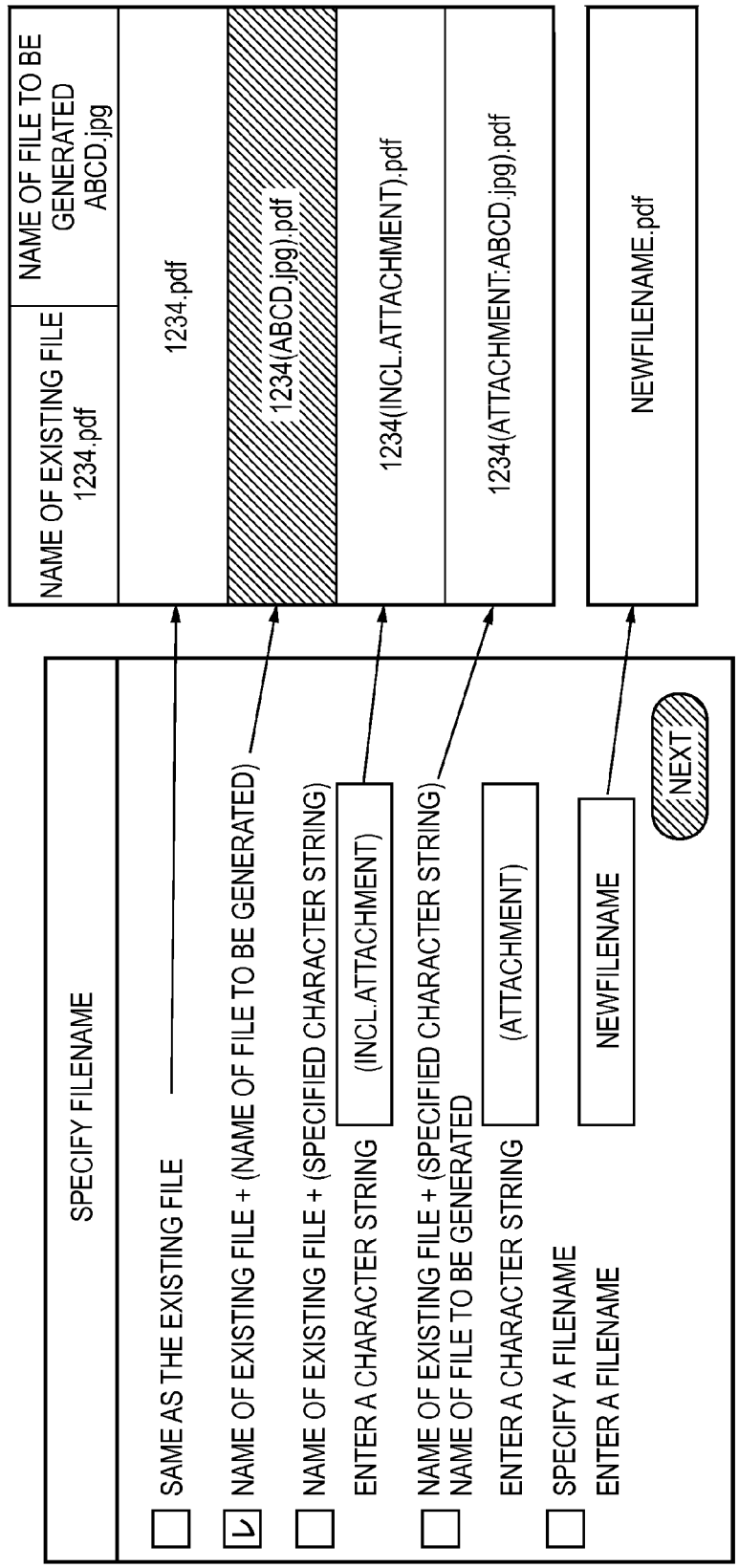
FIG. 7 is a view showing an example of the UI screen for determining the filename of a file having an attached file.

The process then proceeds to S113, where a screen as shown in FIG. 7 is displayed on the operating unit 14 for determination of the filename of the existing file including the attached file, to wait for an input by the user.

FIG. 7 is a view showing an example of the UI screen for determination of the filename of the existing file including the attached file.

In the example of FIG. 7, a combination of the name of the existing file (1234.pdf) and the name of the file to be generated (ABCD.jpb) is specified. Other options include "same as the existing file," "name of existing file+(specified character string)," "name of existing file+(specified character string) name of file to be generated," "specify a new filename," etc. The specified character string is an arbitrary character string input by the user at his or her discretion.

See FIG. 7 for examples of the relationship between the user's selection and input of a character string for determination of the filename and the filename of the file including the attached file determined by the selection and the input character string. The determination of the filename may be made, not only from a character string specified by the user, but also from one of the filename of the file to be generated, the filename of the existing file, and a specified character string, or a combination of two or three thereof. The specified character string can be input freely by the user via the operating unit 14. Note that the character string of the filename of the file to be generated excluding its extension may be used for the combination.

The process then proceeds to S114, to determine the method of sending the file to be generated and the destination (specify sending).

Figures 8, 9:
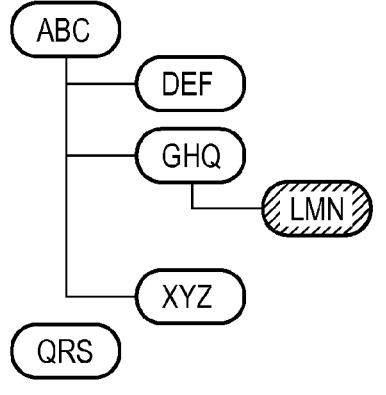
FIG. 8 is a view showing an example of the screen for determining the sending method and the destination.
FIG. 9 is a view showing an example of the screen for selecting an existing file to be attached.

FIG. 8 is an example of the screen for determination of the sending method and the destination. In FIG. 8, an e-mail is selected as the sending protocol, and "2e4r@dfr.jp" is selected as the destination.

In S114, such a screen is displayed to wait for an input by the user via the operating unit 14. Assume that combinations of the sending methods (sending protocols) and the destinations are previously registered and stored in the HDD 13. Various ways have been presented for the registration although the details thereof are omitted here because they are not directly related to the present invention. When a combination of a sending method and a destination is input, the process proceeds to S115, where the reader 15 reads the document and converts the image to electronic data, to generate the file having the specified filename in the specified file format from the resultant electronic data. The process then proceeds to S116, where the specified existing file is opened, and the file generated in S115 is attached to the specified existing file, to generate the attachment-including file. The process then proceeds to S117, where the filename, which is the specified character string, is given to the attachment-including file. The process then proceeds to S118, where the communication unit 16 sends the attachment-including file to the specified destination by the specified sending method via the communication line 101. The process then returns to S103.

If the input is "attach an existing file to a file to be generated (bear attachment)" in S109, the process proceeds to S119, where a screen as shown in FIG. 9 for specifying the existing file to be attached is displayed on the operating unit 14, to wait for an input by the user.

FIG. 9 is a view showing an example of the screen for selection of the existing file to be attached.

Using this screen, the user can specify the electronic apparatus and the folder in which the existing file to be attached to the file to be generated is present, and can specify a file (or a plurality of files) out of the files in the folder. In FIG. 9, two files in folder LMN are selected.

The process then proceeds to S120, to determine the filename of the file to be generated by reading the document with the reader 15. To determine the filename, various ways have been presented although the details thereof are omitted here because they are not directly related to the present invention.

Figure 10:
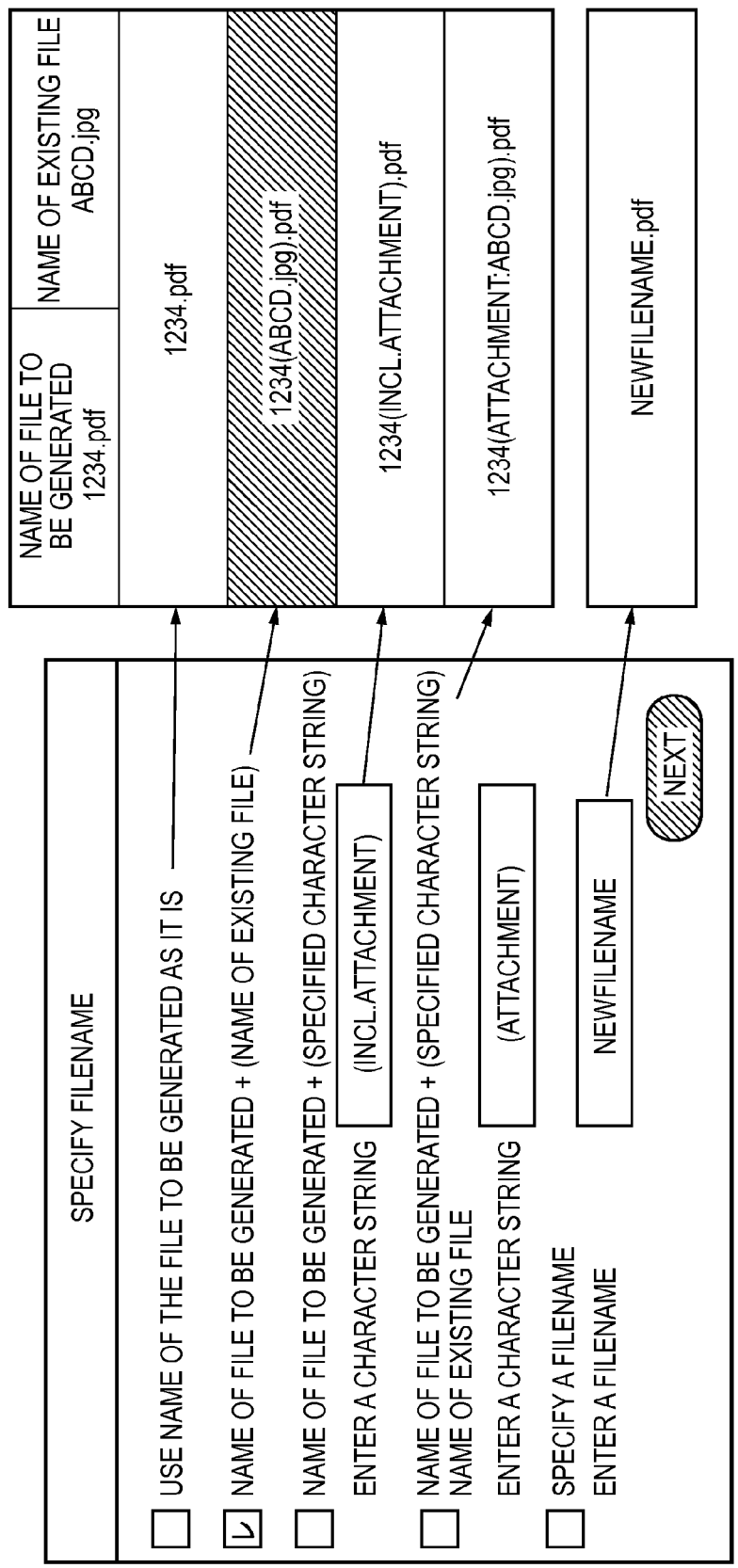
FIG. 10 is a view showing an example of the screen for specifying the filename of a file having an attached existing file.

A screen as shown in FIG. 10 is then displayed on the operating unit 14 for determination of the filename of the file including the attached file, to wait for an input by the user. In this way, the filename of the file including the attached file is determined in S121.

FIG. 10 is a view showing an example of the screen for specifying the filename of the file to be generated including the existing file attached thereto.

See FIG. 10 for the relationship between the user's selection for determination of the filename and the filename of the file including the attached file determined by the selection. In FIG. 10, selected is a combination of the name of the file to be generated and the name of the existing file. The determination of the filename may be made, not only from a character string specified by the user, but also from one of the name of the file to be generated, the name of the existing file, and a specified character string, or a combination of two or three thereof. The specified character string can be input freely by the user via the operating unit 14. Note that the filename of the existing file to be attached excluding its extension may be used for the combination.

The process then proceeds to S122, to determine the method of sending the file to be generated and the destination. For the determination of the sending method and the destination, a screen as shown in FIG. 8 described above is displayed on the operating unit 14 to wait for an input by the user. Assume that combinations of the sending methods and the destinations are previously registered and stored in the HDD 13. Various ways have been presented for the registration although the details thereof are omitted here because they are not directly related to the present invention.

When a combination of a sending method and a destination is input, the process proceeds to S123, where the reader 15 reads the document, to generate the file having the specified filename in the specified file format. The process then proceeds to S124, where all the specified existing file or files are attached to the generated file. The process then proceeds to S125, where the filename is given to the file including the existing file attached thereto in the specified way. The process then proceeds to S126, where the communication unit 16 sends the generated file including the existing file attached thereto to the specified destination by the specified sending method via the communication line 101. The process then returns to S103.

As described above, in Embodiment 1, a generated file can be attached to an existing file, or a file including an existing file attached to a generated file can be prepared, and the resultant file can be sent to a desired destination under a specified send protocol. At this sending, the filename of the file including an attached file can be specified.

In Embodiment 1, the existing file to which the generated file is attached, or the existing file attached to the generated file, is described as being present outside the image processing apparatus 100. Alternatively, the existing file may be present inside the image processing apparatus 100.

In Embodiment 1 described above, the attachment-including file is sent using a previously registered combination of a sending method and a destination. Alternatively, the sending method and the destination may be specified individually every time a file is sent.

[Embodiment 2]

Next, Embodiment 2 of the present invention will be described. The configuration of an image processing apparatus 100 of Embodiment 2 is similar to that of Embodiment 1 described above, and thus description thereof is omitted here.

Figure 11A:
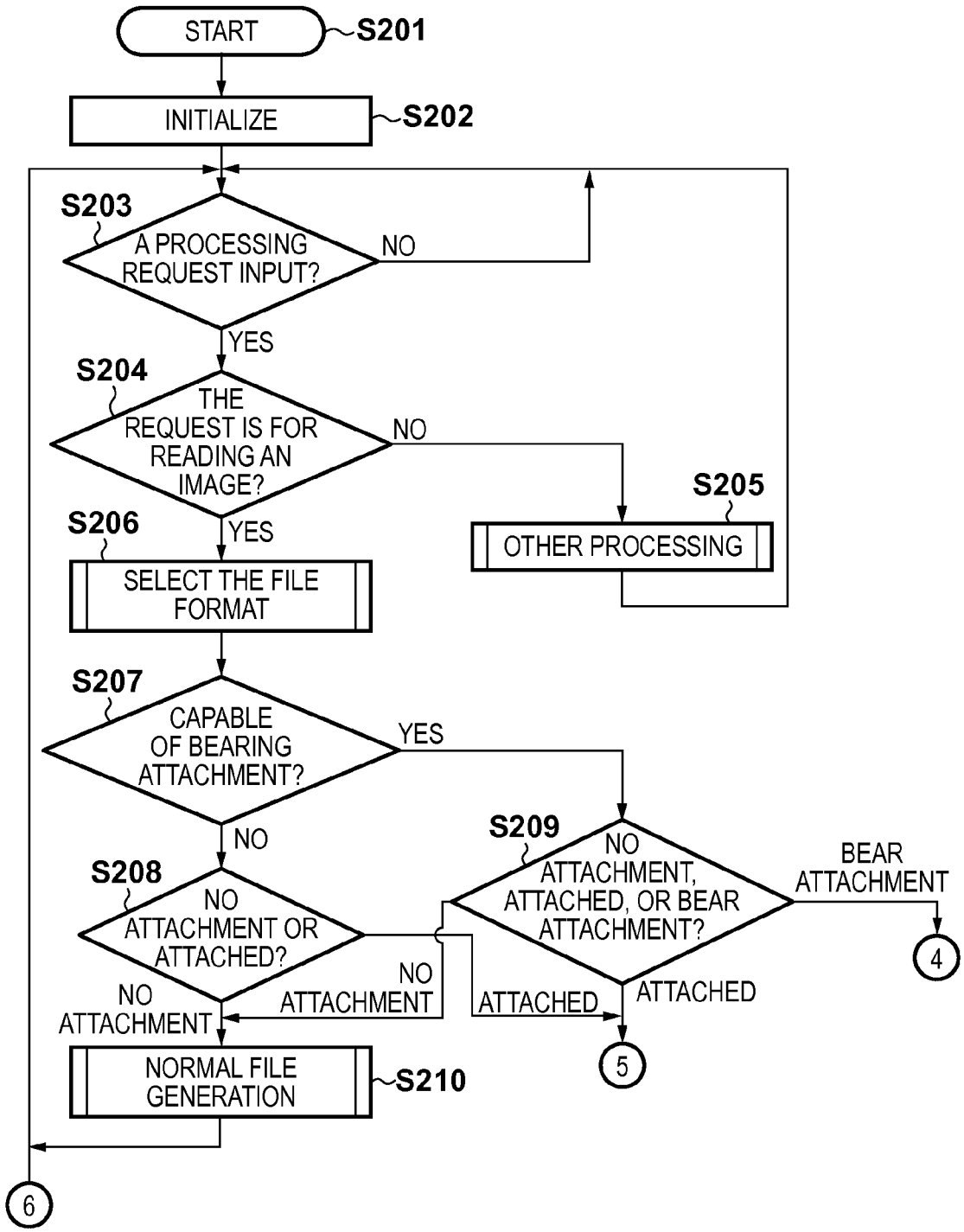
FIGS. 11A and 11B are flowcharts of the operation of an image processing apparatus of Embodiment 2.
Figure 11B:
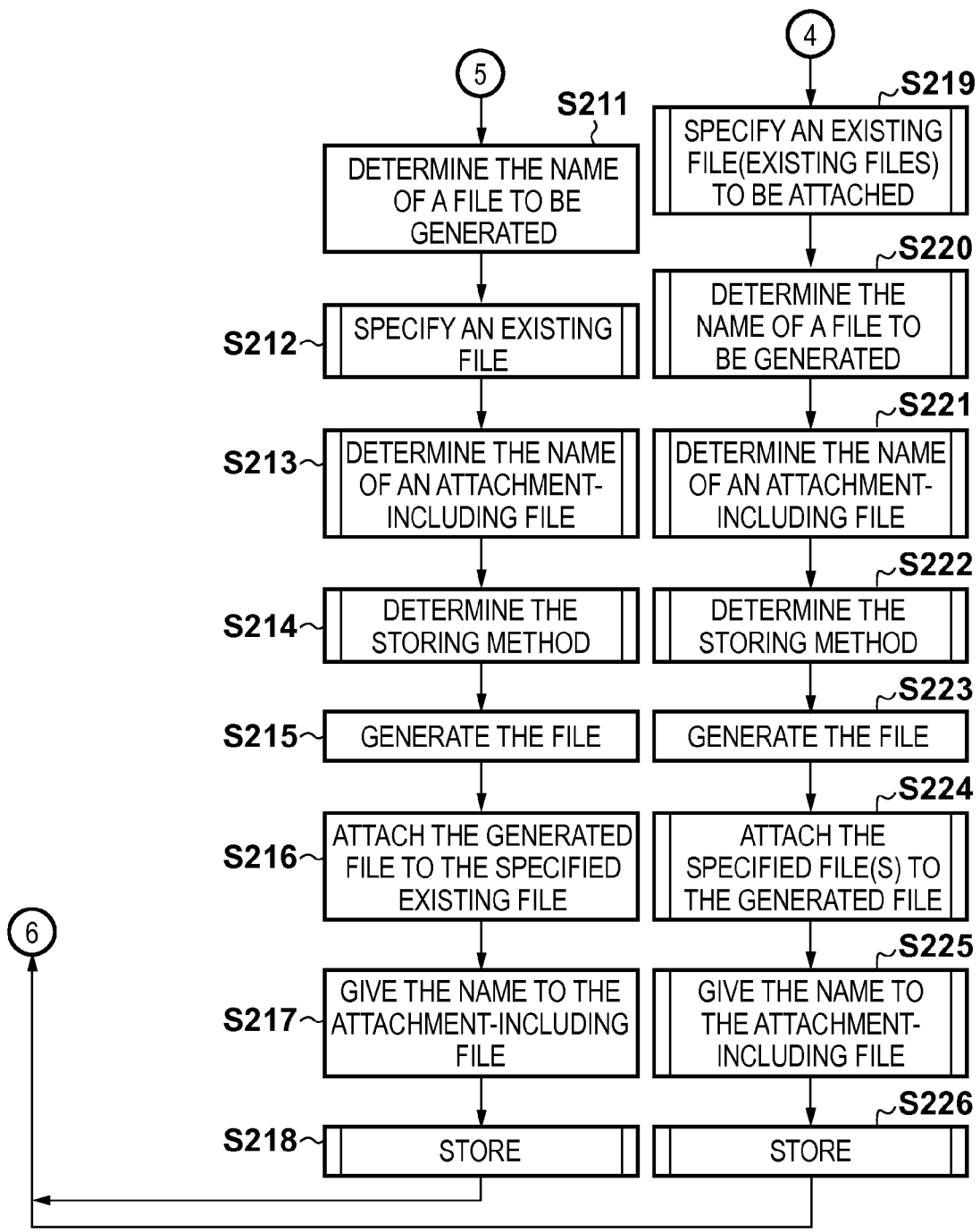

FIGS. 11A and 11B are flowcharts showing the operation of the image processing apparatus of Embodiment 2. Note that the program for executing the illustrated processing is installed in the HDD 13, expanded in the RAM 12 at the time of execution, and executed under the control of the CPU 11.

In FIGS. 11A and 11B, the processing of S201 to S213 are the same as that of S101 to S113 in Embodiment 1 shown in FIGS. 2A and 2B, and thus description thereof is omitted here.

Figure 12A:
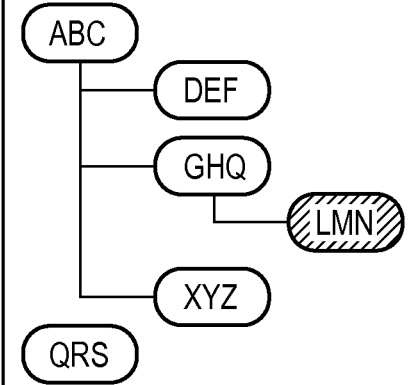
FIGS. 12A and 12B are views showing examples of the screen for specifying the file storage location.
Figure 12B:
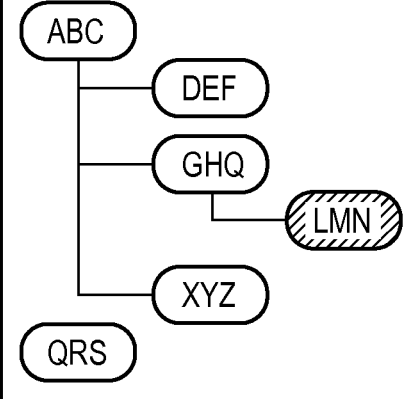

In S214, the operating unit 14 displays a screen as shown in FIG. 12A for determination of the storing method including a folder for storing the attachment-including file, to wait for an input by the user.

FIG. 12A is a view showing an example of the screen for specifying the file storage location (designation).

In FIG. 12A, it is specified to store the file in "the same folder as the existing file" and "change the name of the existing file and save if the filenames are the same."

Figure 13:
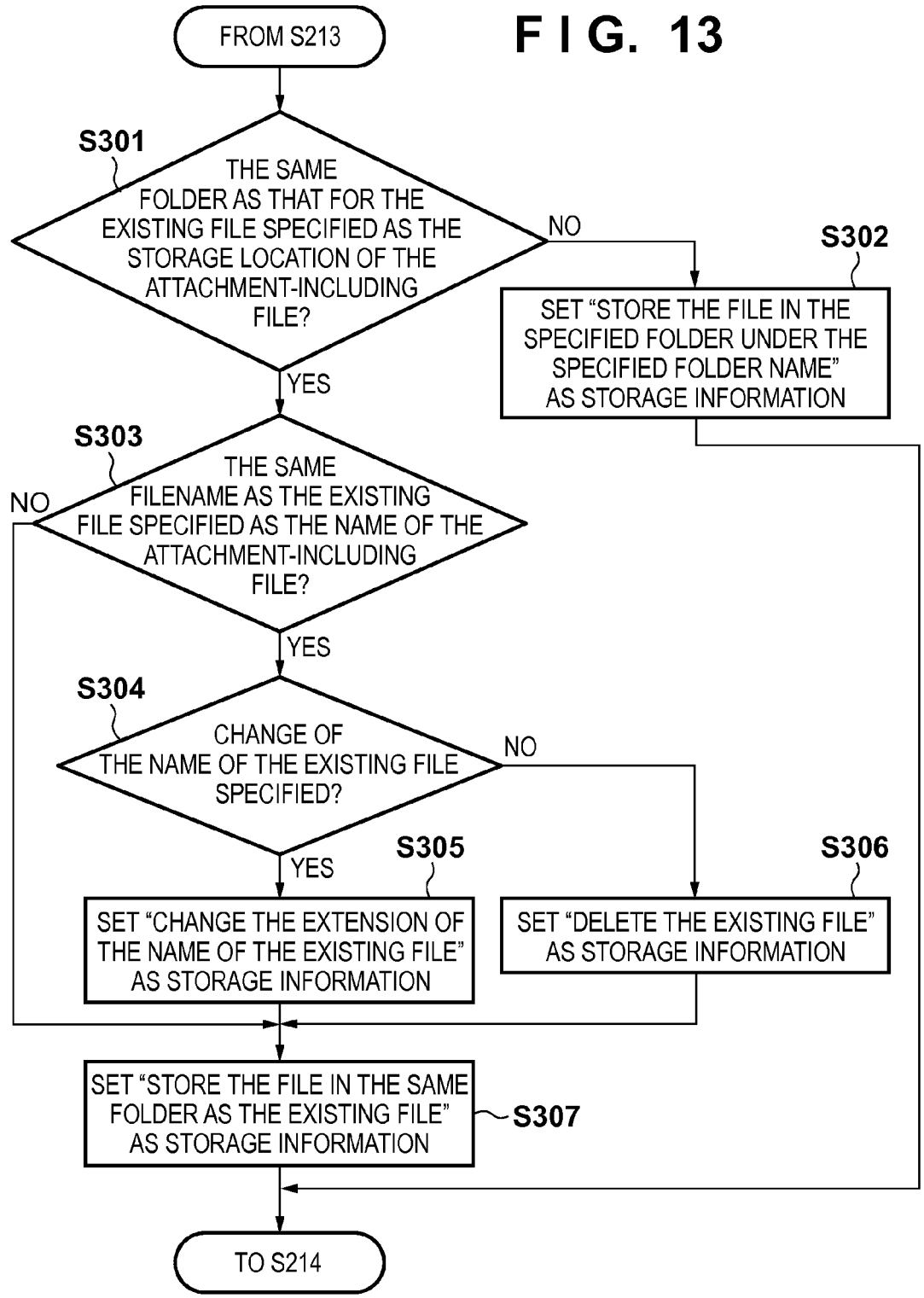
FIG. 13 is a flowchart showing the details of the processing of determining the storing method in S214.

FIG. 13 is a flowchart showing the details of the processing of determining the storing method in S214.

This processing continues from S213 in FIGS. 11A and 11B. First, in S301, whether the input by the user is storing the file in "the same folder as the existing file" is determined. If not, the process proceeds to S302, to set "store the file in the specified folder under the specified folder name" as storage information, and then proceeds to S214.

In S301, if the input by the user is storing the file in "the same folder as the existing file," the process proceeds to S303, to determine whether the same filename as the specified existing file has been specified for the attachment-including file. If a different filename has been specified, the process proceeds to S307, to set "store the file in the same folder as the existing file" as storage information. If the same filename has been selected, the process proceeds to S304, to check whether "change the name of the existing file if the filenames are the same" has been selected. If this option of changing the name of the existing file has been selected, the process proceeds to S305, to set "change the extension of the name of the existing file" as storage information. If the option of changing the name of the existing file has not been selected in S304, the process proceeds to S306, to set "delete the existing file" as storage information. After execution of S305 or S306, the process proceeds to S307, to set "store the file in the same folder as the existing file" as storage information, and then proceeds to S214.

In FIGS. 11A and 11B, the processing in S215 to S217 is the same as the processing in S115 to S117 in FIGS. 2A and 2B.

Next, the details of the storing processing in S218 will be described with reference to FIG. 14.

Figure 14:
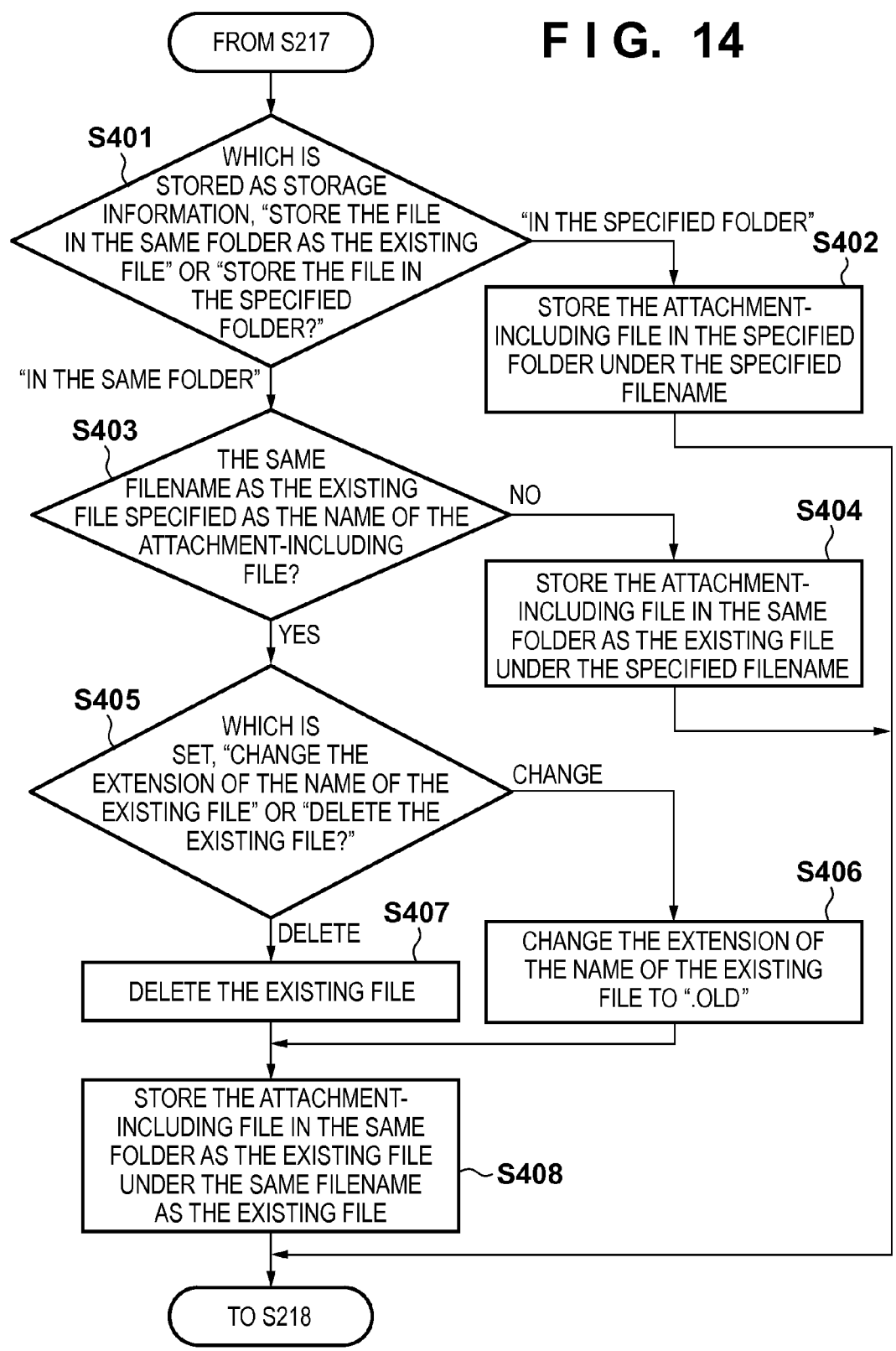
FIG. 14 is a flowchart showing the details of the storing processing in S218 in FIGS. 11A and 11B.

FIG. 14 is a flowchart showing the details of the storing processing in S218 in FIGS. 11A and 11B.

This processing continues from S217 in FIGS. 11A and 11B. First, in S401, which one is set as storage information, "store the file in the same folder as the existing file" or "store the file in the specified folder," is determined. If "store the file in the specified folder" is set, the process proceeds to S402, where the attachment-including file is stored in the specified folder under the specified filename set as storage information, and then proceeds to S218.

If it is determined in S401 that "store the file in the same folder as the existing file" is set, the process proceeds to S403, to check whether the same filename as the existing file has been specified for the attachment-including file. If a different filename has been specified, the process proceeds to S404, to store the attachment-including file in the same folder as the existing file under the specified filename, and then proceeds to S218.

If the same filename as the existing file has been specified in S403, the process proceeds to S405, to determine which one is set as storage information, "change the extension of the name of the existing file" or "delete the existing file." If "change the extension of the name of the existing file" is set, the process proceeds to S406, to change the extension of the name of the existing file to ".old." If "delete the existing file" is set, the process proceeds to S407, to delete the existing file. After execution of S406 or S407, the process proceeds to S408, to store the attachment-including file in the same folder as the existing file under the same filename as the existing file (the filename before change of the extension if the extension is changed). The process then proceeds to S218.

In FIGS. 11A and 11B, the processing in and after S219 is substantially the same as that in S119-S126 in FIGS. 2A and 2B except for changing "sending" to "storing", and thus description thereof is omitted here.

As described above, in Embodiment 2, when there is some correlation between the name of the existing file and the folder in which the existing file is stored and the name of the attachment-including file and the folder in which the attachment-including file is to be stored, the filename and the folder for the attachment-including file can be specified by a simple operation.

In the above embodiment, the existing file to which the generated file is attached, or the existing file attached to the generated file, is described as being present outside the image processing apparatus 100. Alternatively, such an existing file may be present inside the image processing apparatus 100.

Although the attachment-including file is sent using a combination of a sending method and a destination registered previously, the sending method and the destination may be input individually every time a file is sent.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-127657, filed Jun. 7, 2011, which is hereby incorporated by reference herein in its entirety.

What is claimed is:

1. An image processing apparatus comprising:
   a document reading unit configured to optically read a document and generate electronic data;
   a generating unit configured to generate an electronic file based on the electronic data;
   a file specifying unit configured to specify a file that is to be attached to the electronic file generated by the generating unit or to which the electronic file generated by the generating unit is to be attached;
   a name specifying unit configured to specify a name of the electronic file generated by the generating unit;
   an attaching unit configured to selectively perform attaching the specified file to the electronic file generated by the generating unit or attaching the electronic file generated by the generating unit to the specified file, and configured to generate an attachment-including file; and
   a sending unit configured to send the attachment-including file to a destination, wherein a name of the attachment-including file is specified based on the name specified by the name specifying unit.

2. The image processing apparatus according to claim 1, further comprising:
   a setting unit configured to set a file format of the electronic file generated by the generating unit; and
   a determining unit configured to determine whether the file format of the electronic file set by the setting unit is a file format permitting attachment of another file to the electronic file,
   wherein, in a case where the determining unit determines that the file format is a file format permitting attachment of another file to the electronic file, the file specifying unit is allowed to specify a file to be attached to the electronic file generated by the generating unit.

3. The image processing apparatus according to claim 1, wherein the file specifying unit specifies the file by a folder and a filename.

4. The image processing apparatus according to claim 1, wherein the name specifying unit further specifies the name of the attachment-including file by using at least one of, or a combination of any of, the name of the electronic file, the name of the specified file, and an arbitrary character string.

5. The image processing apparatus according to claim 1, wherein the file specifying unit specifies a plurality of file candidates to be attached to the electronic file generated by the generating unit.

6. An image processing apparatus comprising:
   a document reading unit configured to optically read a document and generate electronic data;
   a generating unit configured to generate an electronic file based on the electronic data;
   a file specifying unit configured to specify a file that is to be attached to the electronic file generated by the generating unit or to which the electronic file generated by the generating unit is to be attached;
   a name specifying unit configured to specify a name of the electronic file generated by the generating unit;
   an attaching unit configured to selectively perform attaching the specified file to the electronic file generated by the generating unit or attaching the electronic file generated by the generation unit to the specified file, and configured to generate a attachment-including file; and
   a storing unit configured to store the attachment-including file in a storage location, wherein a name of the attachment-including file is specified based on the name specified by the name specifying unit.

7. The image processing apparatus according to claim 6, wherein the storage location includes a folder in which the file specified by the file specifying unit is stored or an arbitrary folder.

8. The image processing apparatus according to claim 6, further comprising:
   a changing unit configured to change either the name of the file specified by the file specifying unit or the name of the attachment-including file in a case where the storage location is a folder in which the specified file is stored and the names of the specified file and the attachment-including file are the same.

9. The image processing apparatus according to claim 6, further comprising:
   a setting unit configured to set a file format of the electronic file generated by the generating unit; and
   a determining unit configured to determine whether the file format of the electronic file set by the setting unit is a file format permitting attachment of another file to the electronic file,
   wherein, in a case where the determining unit determines that the file format is a file format permitting attachment of another file to the electronic file, the file specifying unit is allowed to specify a file to be attached to the electronic file generated by the generating unit.

10. The image processing apparatus according to claim 6, wherein the file specifying unit specifies the file by a folder and a filename.

11. The image processing apparatus according to claim 6, wherein the name specifying unit further specifies the name of the attachment-including file by using at least one of, or a combination of any of, the name of the electronic file, the name of the specified file, and an arbitrary character string.

12. The image processing apparatus according to claim 6, wherein the file specifying unit specifies a plurality of file candidates to be attached to the electronic file generated by the generating unit.

13. A control method for controlling an image processing apparatus, the method comprising:
 a document reading step of optically reading a document and generating electronic data;
 a generating step of generating an electronic file based on the electronic data;
 a file specifying step of specifying a file that is to be attached to the electronic file generated by the generating step or to which the electronic file generated by the generating step is to be attached;
 a name specifying step of specifying a name of the electronic file generated by the generating step;
 an attaching step of selectively performing attaching the specified file to the electronic file generated by the generating step or attaching the electronic file generated by the generating step to the specified file, and generating an attachment-including file; and
 a sending step of sending the attachment-including file to a destination, wherein a name of the attachment-including file is specified based on the name specified by the name specifying step.

14. A control method for controlling an image processing apparatus, the method comprising:
 a document reading step of optically reading a document and generating electronic data;
 a generating step of generating an electronic file based on the electronic data;
 a file specifying step of specifying a file that is to be attached to the electronic file generated by the generating unit or to which the electronic file generated by the generating unit is to be attached;
 a name specifying step of specifying a name of the electronic file generated by the generating step;
 an attaching step of selectively performing attaching the specified file to the electronic file generated by the generating step or attaching the electronic file generated by the generating step to the specified file, and configured to generate an attachment-including file; and
 a storing step of storing the attachment-including file in a storage location, wherein a name of the attachment-including file is specified based on the name specified by the name specifying step.

15. An image processing apparatus comprising:
 a document reading unit configured to optically read a document and generate electronic data;
 a generating unit configured to generate a first file based on the electronic data;
 a storage unit configured store a second file;
 an accepting unit configured to accept, from a user, either an instruction for attaching the first file to the second file or an instruction for attaching the second file to the first file;
 an attaching unit configured to, based on the instruction accepted by the accepting unit, selectively perform attaching the first file to the second file or attaching the second file to the first file and configured to generate an attachment-including file; and
 a sending unit configured to send the attachment-including file to a destination.

16. The image processing apparatus according to claim 15, wherein the destination is a storage location, and the sending unit sends the attachment—including file to the storage location.

17. The image processing apparatus according to claim 15, wherein the accepting unit is configured to further accept, from the user, an instruction for preventing from attaching any file to the first file.

18. A control method for controlling an image processing apparatus, the method comprising:
 optically reading a document and to generate electronic data;
 generating a first file based on the electronic data;
 storing a second file;
 accepting, from a user, either an instruction for attaching the first file to the second file or an instruction for attaching the second file to the first file;
 selectively performing attaching the first file to the second file or attaching the second file to the first file based on the accepted instruction, and generating an attachment—including file; and
 sending the attachment-including file to a destination.

* * * * *